E. D. TILLYER.
EYE TESTING DEVICE.
APPLICATION FILED APR. 28, 1917.
1,246,495.   Patented Nov. 13, 1917.
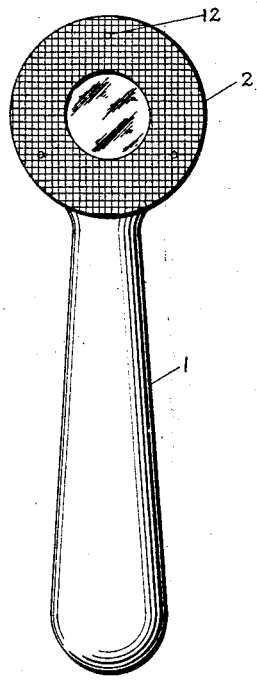
Fig. I.
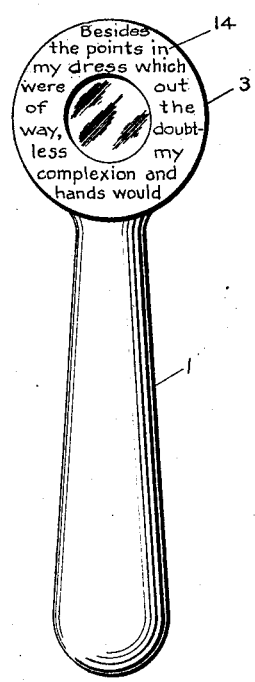
Fig. II.
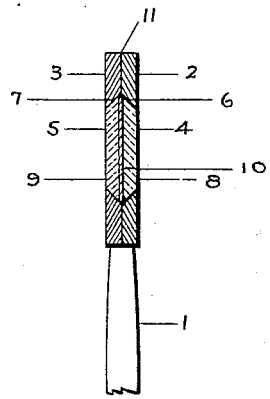
Fig. III.
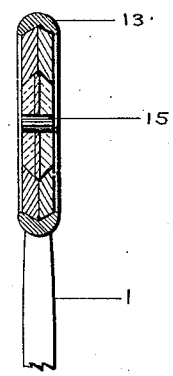
Fig. IV.
WITNESSES
C. Horace Pond
William C. Jenning.
INVENTOR
EDGAR D. TILLYER
BY
H. H. Styll  A. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, A VOLUNTARY ASSOCIATION OF MASSACHUSETTS.

EYE-TESTING DEVICE.

1,246,495.     Specification of Letters Patent.     Patented Nov. 13, 1917.

Application filed April 28, 1917. Serial No. 165,112.

*To all whom it may concern:*

Be it known that I, EDGAR D. TILLYER, a citizen of the United States, residing at Southbridge, in the county of Worcester and State of Massachusetts, have invented certain new and useful Improvements in Eye-Testing Devices, of which the following is a specification.

This invention relates to improvements in eye testing devices and has particular reference to that type of device commonly known as a retinoscope or ophthalmoscope.

The leading and principal object of the present invention is the provision of an improved form of retinoscope which may be employed for examining the eye either at rest or in action that is to say either static or dynamic retinoscopy, as desired.

A further object of the present invention is the provision of an improved reversible retinoscope in which opposite sides may be used for different types of retinoscopic work and which will thus provide an extremely compact, efficient and desirable instrument for the intended purposes.

Other objects and advantages of my improved device should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a view of one side of my improved retinoscope.

Fig. II represents a view of the opposite side thereof.

Fig. III represents a vertical sectional view of the retinoscope.

Fig. IV represents a similar view of a modified construction.

In the drawings, the numeral 1 is employed to designate the handle of my improved retinoscope bearing at the outer end the pair of disks 2 and 3, formed with the central apertures 4 and 5, having outer beveled walls 6 and 7, respectively. This construction will be best understood by reference to Fig. III from which it will be seen that the two beveled walls of the apertures together serve to form a groove adapted to receive the transparent or reflecting portion of my device. This transparent or reflecting portion preferably comprises the glass or other transparent disks 8 and 9, having formed thereon or mounted therebetween the transparent reflecting film 10 both sides of which have the property of reflection of light rays, which thus provides for my device a double mirror capable of reflecting impinging light rays back in the general direction of their source, irrespective of which side of the device they strike. At the same time on account of the transparent feature of the film it is possible for a person placing his eye near the device to look through the film and in the direction in which the light rays are being reflected.

The members 2 and 3 may be suitably secured together to retain in position the transparent disk and film, either by an adhesive 11, or a plurality of screws or fastening devices 12, or combination of both, as illustrated in Fig. I for example, or may be held in place by a suitable frame 13 extending therearound, as illustrated in Fig. IV.

In any event I form one of said members, as for example the member 2, of black or other dark material, as when it is desired to have the eye focused at some point other than directly upon the retinoscope itself, as for example on a chart back of the operator, while the opposite side I preferably form from white or other light colored material, or else secure such material upon the member 3 and produce upon said member suitable reading matter 14, on which the eye of the patient is to be fixed during the testing operation.

While I have particularly described this invention as usable in connection with a non-perforated disk, since this is its preferred form, it will be understood that it is possible to carry out the generic principle of my invention by the use of two ordinary retinoscopic mirrors placed back to back and mounted within the single frame, these mirrors having the central sight aperture 15 as illustrated in Fig. IV. In either event the general purpose and use of my device is the same, in that it has the one side bearing the chart or reading matter on which the eye of the patient is to be fixed and the opposite side preferably black so as not to attract the eye of the patient, as when the patient is intended to look at a point other than the operator during the testing operation and in this manner I am able to employ the single retinoscope for both static and dynamic retinoscopy, and produce equally efficient results in either event.

Particular attention is invited to the fact that in connection with the form of the invention particularly illustrated in Fig. III it is merely necessary to employ the single transparent reflecting film 10, which may be suitably deposited upon either the member 4 or member 5 and on account of its polished outer face will have equally satisfactory reflection through the loose member held thereagainst, while at the same time this loose member serves as a cover plate or protector to prevent damage to the film, thus providing a readily reversible retinoscope in which a single reflecting medium satisfies the requirements of the device as to reflecting of light toward the patient and allowing vision of the operator through the mirror irrespective of the side of the device disposed toward the patient.

I claim:

1. A reversible retinoscope, including a double mirror and a mounting for the mirror, plain on one side and bearing suitable configurations on the opposite side, said double mirror having a portion at least transparent to permit vision therethrough.

2. A retinoscope comprising a pair of transparent disks, a single reflecting medium between said disks, said reflecting medium having the property of reflection of light in both directions through the disks, and means for supporting the disks and film in operative relation, said supporting means being plain on one side and bearing suitable configurations on the opposite side thereof.

3. A device of the character described, including a handle, a pair of disks carried by the handle and having alined central apertures, and a transparent reflecting medium secured in the apertures and having portions fitting between the disks, said medium comprising a pair of transparent disks and a transparent film mounted between the disks, both faces of said film having the property of reflection of light rays impinging thereon.

4. A device of the character described, including a handle, a pair of disks carried by the handle and having alined central apertures, and a transparent reflecting medium secured in the apertures and having portions fitting between the disks, said medium comprising a pair of transparent disks and a transparent film mounted between the disks, both faces of said film having the property of reflection of light rays impinging thereon, and means for securing the main disks together to retain the transparent disks and film in position therebetween.

In testimony whereof I affix my signature in the presence of two witnesses.

EDGAR D. TILLYER.

Witnesses.
H. K. PARSONS,
E. M. HALVORSEN.

Copies of this patent may be obtained for five cents each, by addressing the "Commissioner of Patents, Washington, D. C."